July 17, 1928.
A. W. HARRISON
1,677,633
POWER BRAKE FOR MOTOR VEHICLES
Filed Nov. 20, 1924
4 Sheets-Sheet 1
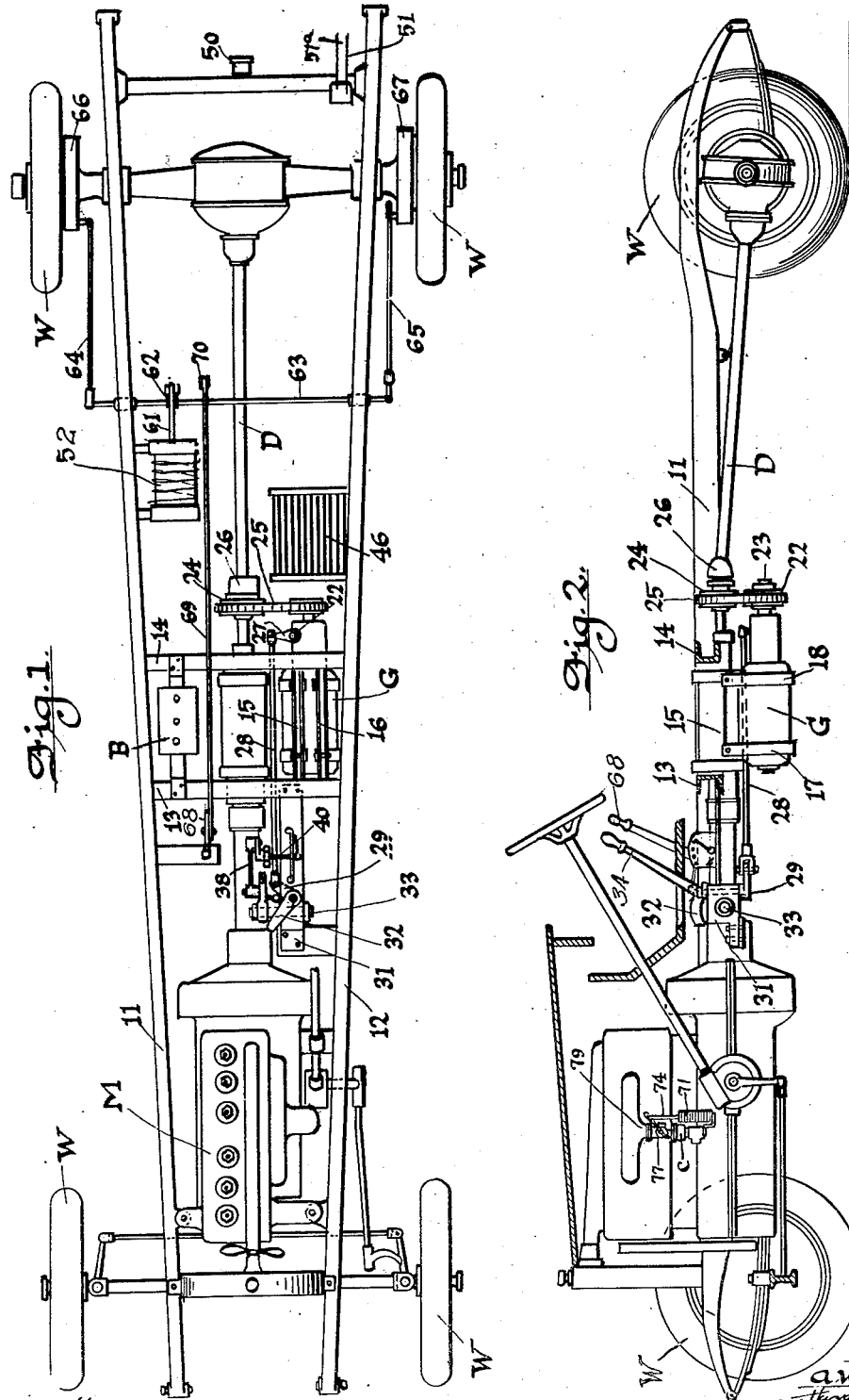

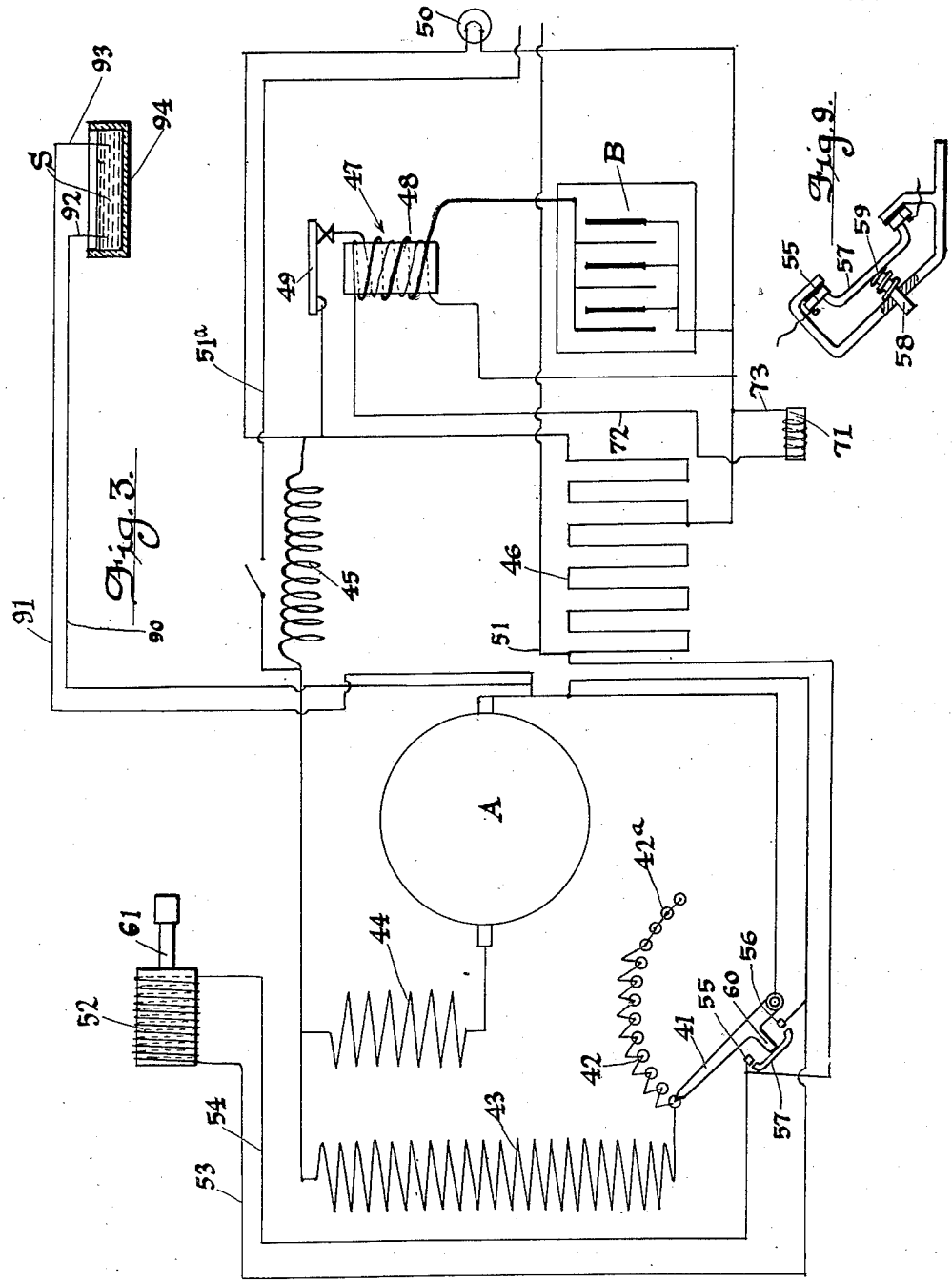

July 17, 1928.  
A. W. HARRISON  
POWER BRAKE FOR MOTOR VEHICLES  
Filed Nov. 20, 1924  
1,677,633  
4 Sheets-Sheet 3

Inventor  
A. W. Harrison  
By Hazard and Miller  
Attorneys

Witness:  
Wm. J. Hall

July 17, 1928.  
A. W. HARRISON  
POWER BRAKE FOR MOTOR VEHICLES  
Filed Nov. 20, 1924     4 Sheets-Sheet 4

1,677,633

Inventor:
A. W. Harrison.

Patented July 17, 1928.

1,677,633

UNITED STATES PATENT OFFICE.

ARTHUR W. HARRISON, OF EAGLE ROCK, CALIFORNIA, ASSIGNOR OF ONE-HALF TO THOMAS D. SEXTON, OF LOS ANGELES, CALIFORNIA.

POWER BRAKE FOR MOTOR VEHICLES.

Application filed November 20, 1924. Serial No. 751,078.

This invention relates to improvements in brakes for vehicles and especially for automobiles.

It is an object of the invention to provide a brake for an automobile which consists of an electric generator adapted to be driven by the wheels of the vehicle and the drive shaft and to provide an adjustment associated with the generator so that the braking power may be varied.

It is a further object of the invention to provide a brake for an automobile which consists of an electric generator driven by the drive shaft together with a device for disconnecting the generator from the drive shaft and connecting it therewith, which device will also operate the adjustment of the generator so as to vary the braking power.

Another object of the invention is to provide a brake for a vehicle consisting of an electric generator and to provide means for dissipating the electric energy generated by the generator in various ways, one of which may be in the form of heat, another may be in storing the electric energy in a storage battery or in similar electric energy storing devices, and still a further form may be in employing the electric energy to reversibly drive motors upon a trailer drawn by the automobile so as to provide an electric brake for the trailing vehicle.

Another object of the invention is to provide an automobile with a brake consisting of an electric generator and provide a mechanism associated therewith, which when the generator is being operated to brake, the vehicle will simultaneously close the passageway between the carburetor and the manifold of the motor of the vehicle and which will admit air directly to the manifold and to the cylinders.

A still further object of the invention is to provide an electric brake for an automobile consisting of an electric generator with means for varying the field current of the generator and with a mechanism which will be operated when the field current is maximum to separately apply a friction brake upon the wheels of the vehicle.

Figure 4:
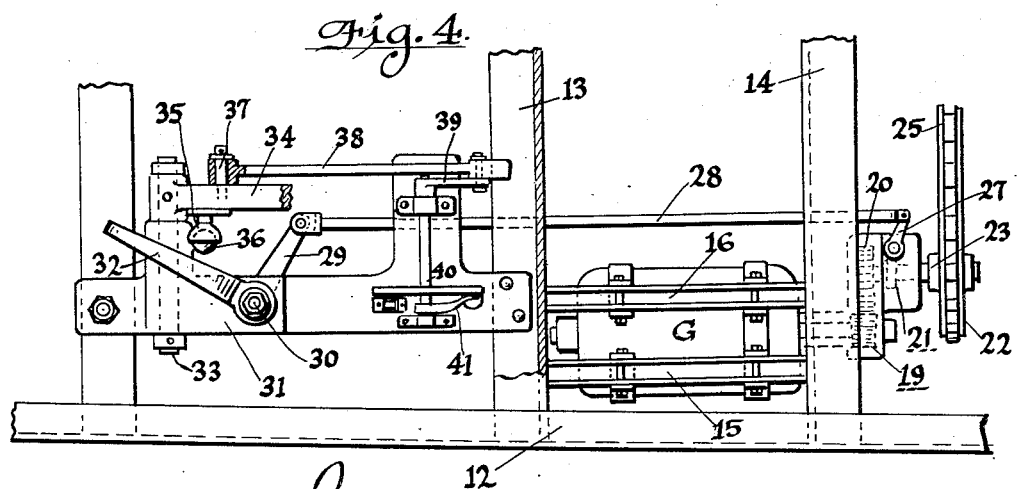
Figure 5:
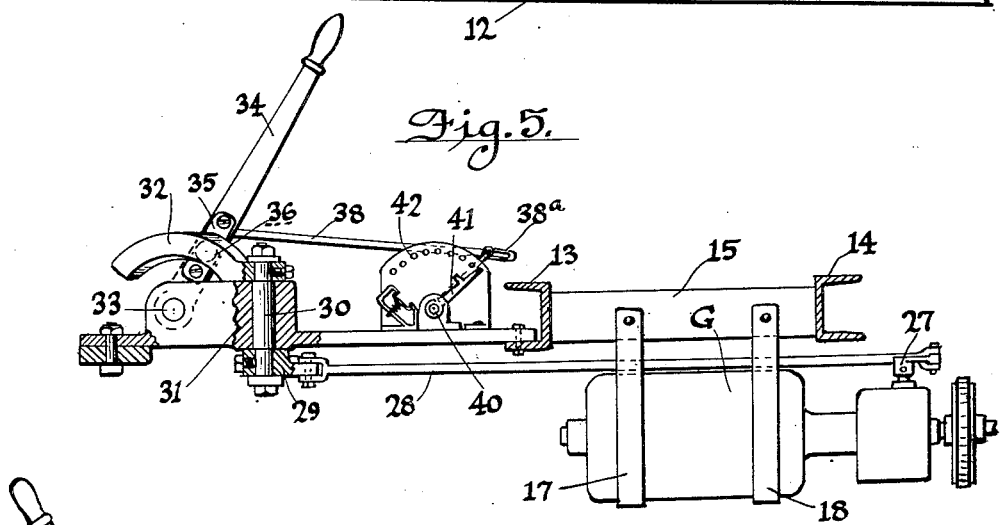
Figure 6:
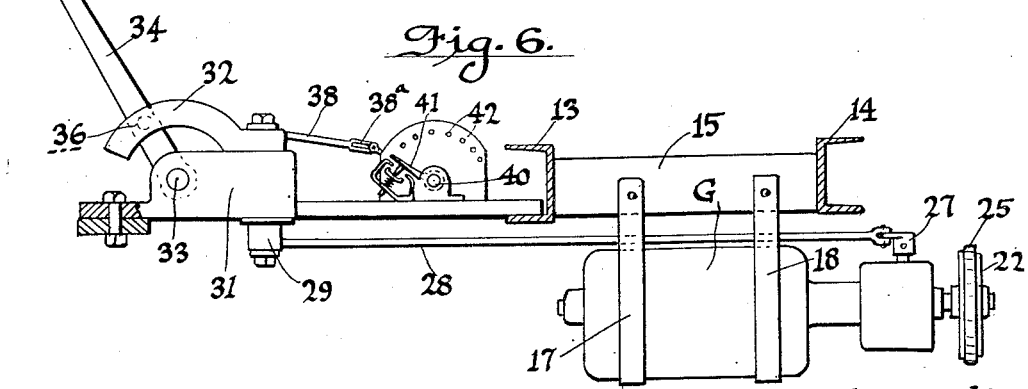
Figure 10:
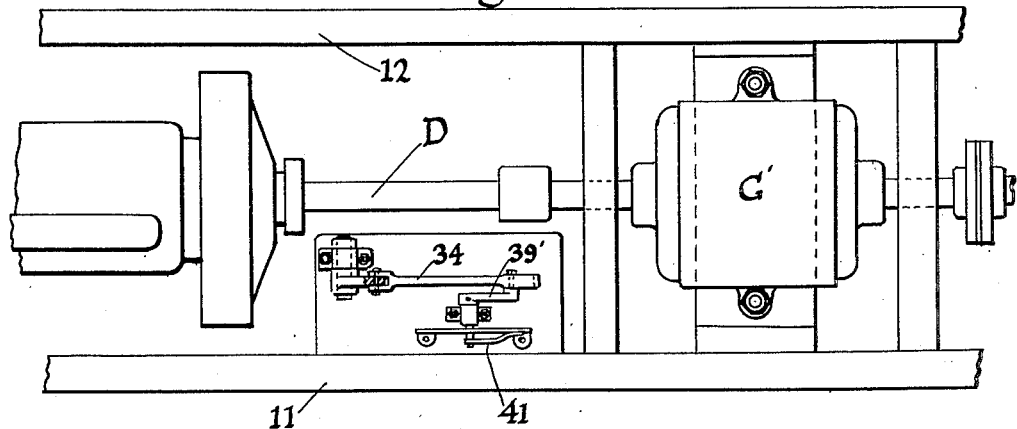
Figure 7:
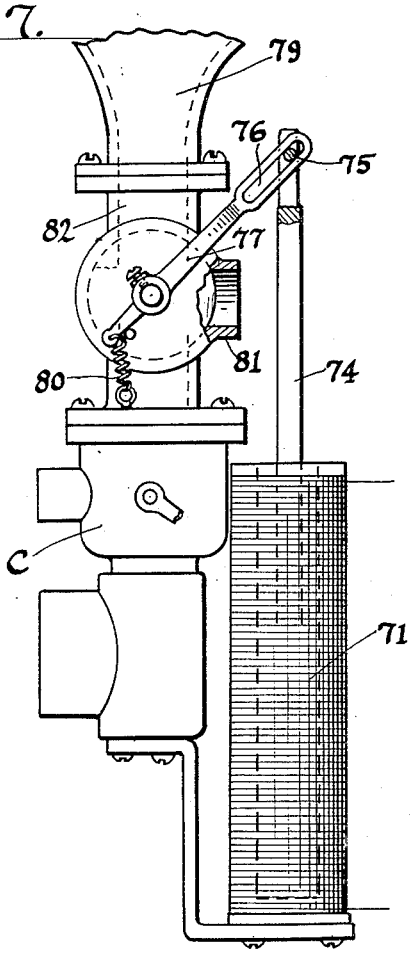
Figure 8:
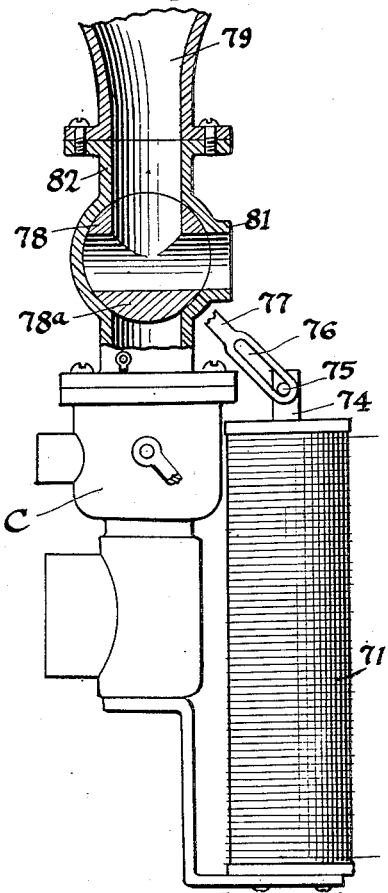

With the foregoing and other objects in view which will be made manifest in the following detailed description and pointed out in the appended claims, reference is had to the accompanying drawings for an illustrative embodiment of the invention, wherein:

Figure 1 is a top plan view of a chassis of an automobile upon which the improved braking device is shown as having been applied, Fig. 2 is a side elevation of the chassis shown in Fig. 1, with the wheels and one longitudinal frame member being shown as removed, Fig. 3 is a wiring diagram of the electric brake, showing auxiliary mechanisms associated therewith, Fig. 4 is a top plan view of a portion of Fig. 1, showing the braking device upon an enlarged scale, Fig. 5 is a side elevation of the mechanism shown in Fig. 4, parts being broken away and shown in section, Fig. 6 is a view similar to Fig. 5, the operating mechanism being shown in an extreme position, opposite to that shown in Fig. 5, Fig. 7 is a view in side elevation showing the mechanism for controlling the fuel delivered from the carburetor of the vehicle, Fig. 8 is a similar view to Fig. 7, the mechanism being shown in an extreme position opposite that shown in Fig. 7, Fig. 9 illustrates a detail of construction, and Fig. 10 is a top plan view of a portion of the chassis of the vehicle showing a modification of the improved braking device.

Referring to the accompanying drawings wherein similar reference characters designate similar parts throughout, the chassis of an automobile shown as mounted upon wheels W and having a motor M, has its longitudinal frame members 11 and 12 provided with a pair of cross bars or supporting members 13 and 14. Secured across the cross bars 13 and 14 are a pair of channel supports 15 and 16 from which a generator G is suspended by means of straps 17 and 18. The generator G has its armature provided with a pinion 19, shown in Fig. 4, adapted to mesh with a gear 20 which has a clutch 21 operatively connected therewith and which is connected with a sprocket 22 by means of a shaft 23.

In the preferred form of invention, the drive shaft D is provided with a sprocket 24 and a suitable sprocket chain 25 passes over the sprockets 22 and 24 so that a drive mechanism is provided to drive the generator G from the drive shaft D. Preferably the universal joints 26 of the drive shaft D are disposed rearwardly of the sprocket 24 so that the sprocket 24 will always have a fixed relation with reference to the frame of the vehicle and to the generator. As shown in Figs. 1 and 4, the sprocket 24 is considerably larger than the sprocket 22 and also the gear 20 is considerably larger than the pinion 19, so that the speed of rotation of the armature of the generator G is many times greater than the speed of rotation of the drive shaft D.

The clutch 21 is operated by a lever 27 which is pivotally connected to a link 28 having its other end pivoted to a lever 29 fixedly mounted upon a spindle 30 rotatable within a support 31 secured upon the frame of the vehicle. As shown in Fig. 5, the top of the spindle 30 has fixed thereon an arcuate member 32. A shaft 33 extends through the support 31 and has mounted thereon a hand lever 34 which, in the illustrated form of invention, serves to operate the brake although it is to be understood that a foot pedal may be substituted for the hand lever 34. The hand lever 34 carries a socket 35 in which is a ball or anti-friction bearing 36 adapted to engage the arcuate member 32 as the hand lever 34 is pushed forward. As will be understood from an inspection of Figs. 4 and 5, as the hand lever 34 is moved forward, the arcuate member 32 will be moved in the direction indicated because of the engagement of the anti-friction bearing 36 therewith. This will swing the lever 29 causing the lever 27 to operate the clutch connecting the generator G with the drive shaft D as will be understood.

The hand lever 34 is provided with a spindle 37 upon which is pivoted a link 38 connected with a crank 39 mounted upon a shank 40 which carries an arm 41 adapted to engage any one of a series of contacts 42 which constitute part of a rheostat controlling the resistance in series with the field of the generator G, thereby controlling the field current of the generator.

The link 38 in the form of the construction shown in Fig. 5, has a slotted connection 38ª with the crank 39 so that the lever 34 can be moved forward a given amount so as to operate the clutch 21 before the arm 41 is moved, causing the variation of the field of the generator. As a modified form of this feature of the invention, Fig. 3 shows contacts 42ª which are not connected with a resistance allowing the arm 41 to move over the contacts 42ª while the clutch is being operated to connect the generator G to the drive shaft D without varying the resistance in series with the field of the generator. Referring to Fig. 3, it is to be understood that the generator G may be a series wound generator or a shunt wound generator, but a generator having a cumulative compound winding is preferably employed having a shunt field 43 which is in series with the rheostat and having its series field 44 in series with the armature A, as shown.

An inductive resistance 45 constitutes a portion of the load of the generator and is employed to prevent the initial surge of current produced by the generator from becoming so large as to burn up or otherwise damage the complete device. The major portion of the load of the generator constitutes a non-inductive resistance 46 which in the preferred form of the invention, are cast iron grids exposed to the air so that heat developed in the non-inductive resistance 46 may be dissipated.

The apparatus or mechanism as has been previously described constitutes the device which accomplishes the broad primary object of the invention. The automobile receives its braking power because of the fact that the drive shaft D is forced to drive the generator G which has a variable load because of the variable field current. The actual ohmic resistance of the load may in some cases be substantially constant with the exception for the heating effect which will of course raise the actual resistance of the cast iron grids by varying the field current. The current sent through the load will vary causing a variable amount of power to be supplied to the generator. This provides for the braking means for the automobile.

It is seen that the above described mechanism provides a means for connecting a generator to the drive shaft or drive mechanism of a vehicle by means of a clutch, and that a device is associated with the generator such that a single lever may be caused to first operate the clutch and then cut out the resistance in the field of the generator, thereby increasing the field current. The current generated by the generator G may be employed to charge a storage battery B, and as shown in Fig. 3, the storage battery being shown as connected in parallel with a portion of the load is provided with a low voltage cut-out, generally designated at 47, which in the conventional form of construction consists of a solenoid 48 adapted to attract a switch 49 when current is placed upon upon the load, so that some current will pass through the battery B, causing the same to be charged.

A stop light 50 may be also connected in parallel with a portion of the load in a similar manner to that in which the battery B is connected so that the stop light 50 may be simultaneously operated when the generator G is supplying current to the load causing the braking of the vehicle. This association of a stop light with a brake consisting of an electric generator constitutes a further object of the invention.

When the resistance of the rheostat is completely cut out by means of the arm 41 thereby causing the generator G to exert its maximum braking power, it is often desirable that additional brakes be provided to aid the vehicle in coming to a complete stop quickly. To accomplish this result, a solenoid 52 is connected by means of conductors 53 and 54, so as to place the solenoid in series with the load upon the generator. The conductor 53 has a contact 55 and the conductor 54 has a contact 56, which contacts are adapted to be engaged by a shunt or bridging member 57.

The bridging member 57 has a shank 58 about which is coiled a coil spring 59 adapted to normally urge the bridging member 57 into contact with the contacts 55 and 56.

The arm 41 is provided with a nose 60 which engages centrally of the bridging member 57 when the arm 41 is in its extreme position cutting out all field resistance. Thus, it is seen that when all field resistance is cut out thereby causing the generator G to exert its maximum braking power, the bridging member 57 will be held away from the contacts 55 and 56, placing the solenoid 52 directly in series with the load. When the arm 41 has not reached its extreme position, or when the arm 41 has been withdrawn from its extreme position, the bridging member 57 is allowed to engage the contacts 55 and 56, and in this position the bridging member constitutes a shunt, short circuiting the solenoid 52 so that practically no current passes through the solenoid.

A core 61 is slidable within the solenoid 52 and when the solenoid 52 is energized, the core 61 will tend to assume a position centrally therein. This core 61 is pivotally connected to a lever 62 rigid with a shaft 63 which is journaled in the frame members 11 and 12. This shaft 63 has at its ends links 64 and 65 which operate the friction brakes 66 and 67 which are of conventional construction. As the core 61 is drawn within the solenoid 52, it is seen that the shaft 63 will be rotated causing the brakes 66 and 67 to be applied. Springs upon the brakes 66 and 67 are employed to return the core 61 to its original position when the solenoid 52 is no longer energized.

In some cases it may be desirable to apply the brakes 66 and 67 independently of the electric brake. To accomplish this, a hand emergency brake lever 68 is pivoted to the frame and is adapted to operate a link 69 which is pivoted upon a crank 70, also rigidly secured upon the shaft 63 so that the hand emergency brake lever 68 can apply the brakes 66 and 67 as well as the core 61.

The load of the generator may also include means for decomposing a solution or liquid by means of electrolysis. As shown in Fig. 3, conductors 90 and 91 are connected to the generator and conduct current to respective electrodes 92 and 93 which are immersed in any suitable solution S within a basin 94 so that current generated by the generator G may decompose the solution S. This solution S may be water in which a suitable salt has been dissolved or may be simply pure water, which may be decomposed into its components hydrogen and oxygen. The solution S may merely constitute the water rheostat placed upon the load.

In order to provide a means for saving fuel when the brake is applied, a solenoid 71 is connected to the load by means of conduits 72 and 73. This solenoid 71 is mounted adjacent the carburetor C as shown in Figs. 7 and 8. A core 74 is adapted to be drawn downwardly within the solenoid 71 upon the energizing of the solenoid which will occur as soon as any current is supplied from the generator G to the load. In this manner the core 74 will be drawn downwardly into the solenoid as soon as the generator G is applying any braking power.

The core 74 is provided with a pin 75 received in a slot 76 of an arm 77 carried by a three-way valve 78 which is disposed in the pipe between the carburetor C and the manifold 79. The arm 77 with its valve 78 is normally urged into the position shown in Fig. 7 by means of a spring 80 and when the valve 78 is in this position gaseous fuel may pass directly from the carburetor C into the manifold 79 to drive the motor M.

A port 81 is formed in the side of the pipe 82 in which the valve 78 is mounted and when the solenoid 71 is energized causing the core 74 to be drawn downwardly, the arm 77 and the valve 78 will be rotated substantially a quarter of a revolution, bringing the valve 78 substantially into the position shown in Fig. 8, wherein one of the passages of the valve 78 is in alignment with the port 81 so that air may pass directly into the manifold. In this position, it is seen that the portion 78$^a$ of the valve 78 which previously closed the port 81, now closes the passage from the carburetor C to the manifold 79, so that no fuel can be drawn from the carburetor into the manifold. In large trucks which have large bores in their motors and long strokes for the pistons, this fuel saving feature is very advantageous as will be understood.

In the modification shown in Fig. 10, the generator G' may have its armature disposed or mounted directly upon the drive shaft D of the vehicle so that when no braking power is desired, the armature idly rotates within the field. In this construction, the arcuate member 32 and clutch mechanism are eliminated, the hand lever 34' being connected only to the arm 41 of the rheostat controlling the field of the generator. In this form of construction the resistance in the rheostat is variable to a large degree so that the very high resistance can be placed in series with the field of the generator in order that no braking power will be applied by the generator G' when not desired.

From the above it is seen that an electric brake for vehicles is provided which consists of a generator driven by the drive mechanism of the vehicle in which the current generated by the generator may be dissipated in the form of heat or may be used to charge a storage battery, operate a stop signal, apply brakes to a trailing vehicle, and to control the supply of fuel to the motor of the vehicle.

This invention has been described, but modifications thereof may be devised without departing from the spirit thereof, and it is to be understood that such modifications come within the scope of this invention.

I claim:

1. An automobile brake comprising an electric generating device adapted to be driven by the drive mechanism of an automobile, and means for applying a load to said generating device.

2. An automobile brake comprising an electric generator adapted to be driven by the drive mechanism of an automobile, and a clutch mechanism adapted to operatively connect said generator to said drive mechanism.

3. An automobile brake comprising an electric generator adapted to be driven by the drive shaft of an automobile, means for increasing the speed of rotation of said generator over that of the drive shaft, and a clutch mechanism associated with said means.

4. An automobile brake comprising an electric generating device associated with the drive mechanism of an automobile, a load for said generating device, and means for varying the field current of said generating device.

5. An automobile brake comprising an electric generating device associated with the drive mechanism of an automobile, a load for said generating device, and means including a lever located in the driver's compartment of the automobile for varying the field resistance of said generating device.

6. An automobile brake comprising an electric generator, a clutch mechanism adapted to operatively connect said generator to the drive mechanism of an automobile, and means including a single lever adapted to operate said clutch mechanism and to vary the field resistance of said generator.

7. An automobile brake comprising an electric generator, a clutch mechanism adapted to operatively connect said generator to the drive mechanism of an automobile, and means including a single lever adapted to operate said clutch mechanism and to vary the field resistance of said generator, said lever being located in the driver's compartment of the automobile.

8. An automobile brake comprising an electric generator, a clutch mechanism adapted to operatively connect said generator with the drive mechanism of an automobile, and means operable by a single lever adapted to first operate said clutch and to successively vary the field resistance of said generator.

9. An automobile brake comprising an electric generating device associated with the drive mechanism of an automobile, a load for said generating device, and means operable from the driver's compartment of the automobile for varying the braking effort of said generating device.

In testimony whereof I have signed my name to this specification.

ARTHUR W. HARRISON.